(No Model.)
G. P. ADAMSON.
APPARATUS FOR MANUFACTURING ACIDS.
No. 601,457. Patented Mar. 29, 1898.
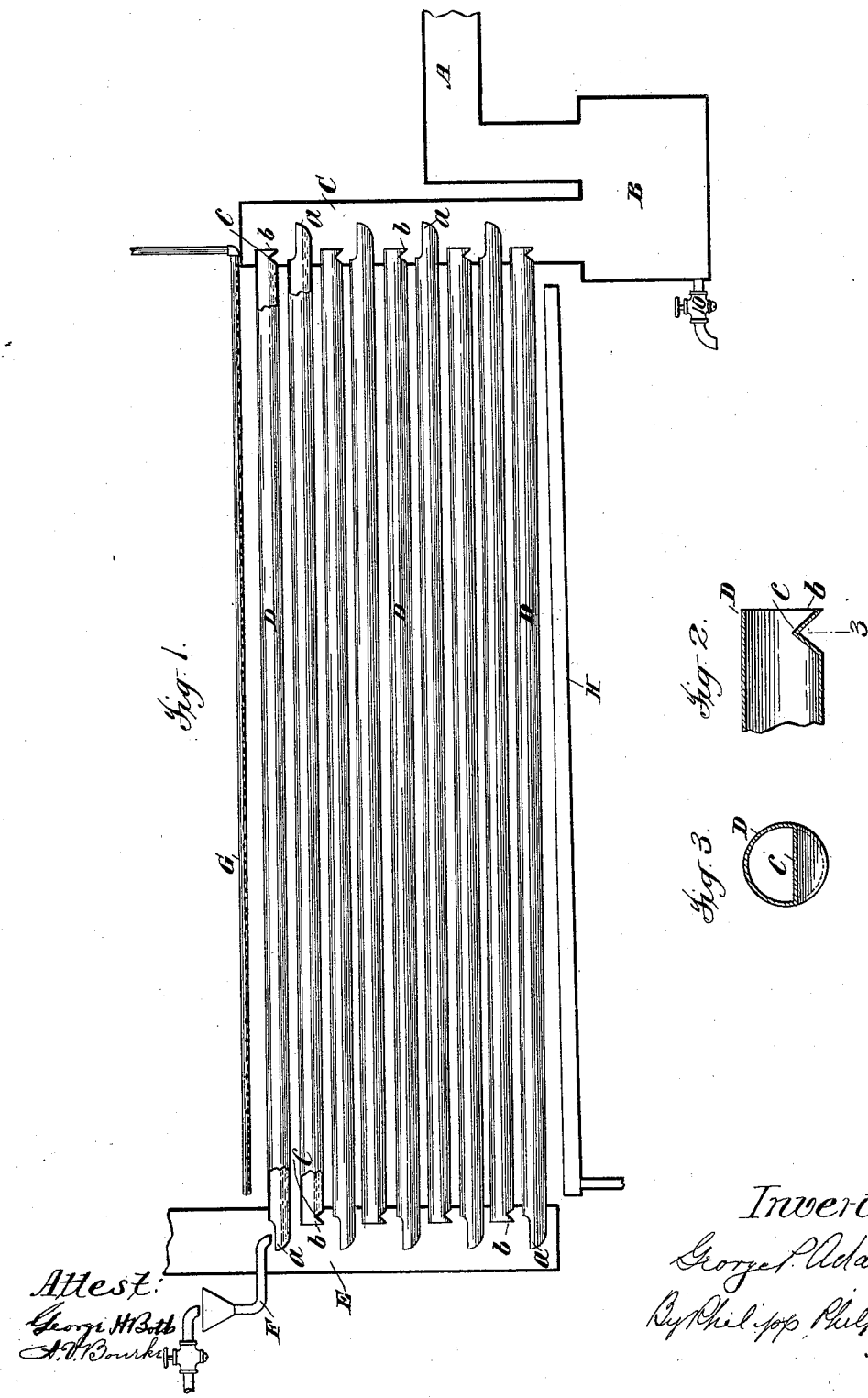

UNITED STATES PATENT OFFICE.

GEORGE P. ADAMSON, OF EASTON, PENNSYLVANIA, ASSIGNOR TO THE BAKER & ADAMSON CHEMICAL COMPANY, OF SAME PLACE.

APPARATUS FOR MANUFACTURING ACIDS.

SPECIFICATION forming part of Letters Patent No. 601,457, dated March 29, 1898.

Application filed June 16, 1897. Serial No. 641,020. (No model.)

*To all whom it may concern:*

Be it known that I, GEORGE P. ADAMSON, a citizen of the United States, residing at Easton, county of Northampton, and State of Pennsylvania, have invented certain new and useful Improvements in Gas-Absorption and Similar Apparatus, fully described and represented in the following specification and the accompanying drawings, forming a part of the same.

This invention relates especially to apparatus for the manufacture of hydrochloric acid and similar substances formed by the absorption of gases by liquids, in which the gas and absorbing liquid are passed in contact through a series of pipes for the absorption of the gas by the liquid, cooling liquid preferably being applied to the pipes to remove the heat liberated by the condensation of the gas, which cooling liquid is preferably applied by sprinkling water over the pipes, the especial object of the present invention being to provide an improved apparatus of this general construction securing an increased absorption of the gas by the liquid in the pipes and a more efficient action of the apparatus. I secure this result by providing the pipes through which the liquid passes with dams at or near their delivery ends at which the liquid passes from the pipes, so that the liquid is retained within the pipes to the level of the top of the dam and flows from the pipes over the top of the dam. This increases the surface of the liquid in contact with the gas, so that a greatly-increased surface contact is secured, and by retarding the flow of the liquid and retaining it for a longer time within the pipes increases greatly the absorption of the gas by the liquid. Any sediment in the liquid also is retained by the dams, so that a better product is obtained, the sediment and liquid retained by the dams being removed after the absorption operation in any suitable manner.

While the invention has been designed in connection with an absorption apparatus for the purpose and of the general operation described above, the invention may be applied also in apparatus of other classes employing similar pipes through which an aeriform fluid and a liquid are to be passed in contact for other purposes.

For a full understanding of the invention a detailed description of an apparatus embodying all the features of the invention in the best form now known to me as applied in connection with the preparation of hydrochloric acid and similar substances will now be given in connection with the accompanying drawings, forming a part of this specification, and the features forming the invention will then be specifically pointed out in the claim.

In the drawings, Figure 1 is a diagrammatic sectional elevation of the apparatus. Fig. 2 is an enlarged central longitudinal section of the delivery end of one of the pipes. Fig. 3 is a cross-section of the same on the line 3 of Fig. 2.

Referring to said drawings, A is a pipe through which the gas to be absorbed enters the apparatus, preferably directly from the still in use for the concentration of hydrochloric acid.

B is a receiver for the acid and from which the acid may be drawn off by the cock 10 or other suitable means.

C is a vertical pipe rising from the top of the receiver B and to which the gas passes from the pipe A through the top of the receiver.

D are approximately horizontal pipes entering the pipe C at one end and at the opposite end communicating with a vertical pipe E.

F is a pipe through which the absorbing liquid is introduced into the top pipe D.

G is a perforated water-pipe above the pipes D for sprinkling cooling liquid on the latter, and H is a trough below the pipes D receiving any cooling liquid not evaporated as it passes over these pipes.

The pipes D form passages for the absorbing liquid and the gas, and these pipes are slightly inclined in opposite directions and constructed so as to form at opposite ends troughs *a* and spouts *b*, the spout at the end of each pipe being above the trough at the end of the next pipe, so that the absorbing liquid, after passing through the whole length of a pipe D, is delivered into the next lower pipe and thus passes through the whole series of pipes and then from the bottom pipe into the receiver B. It will thus be seen that the gas from the pipe A passes through the vertical pipe C into all the pipes D, where it comes into contact with the liquid passing successively through these pipes, so as to be absorbed thereby, any excess of gas passing through the pipes D into the pipe E being delivered from the top of the pipe E, as desired.

Referring now to the construction of the pipes D by which the present invention is carried out, each of the pipes D is provided near its delivery end with a dam $c$, projecting into the pipe a sufficient distance to secure the retention of the water in the pipe to the level required, this dam being shown as extending nearly to the middle line of the pipe. This dam is preferably formed, as shown, by a V-shaped upward projection of the lower wall of the pipe, and the dam is preferably positioned just inside the end of the pipe, as shown, so that the outer side of the dam forms spout $b$, with an inclined surface, over which the water flows from the top of the dam to the trough $a$ of the next lower pipe. By this construction I am enabled to form the dam and spout conveniently and cheaply, and I provide a suitable delivery-spout without increasing the size of the pipe at the end. This latter feature is of value in the practical construction of the apparatus, as both ends of the pipes D may thus be passed through openings in the respective vertical pipes C E without increasing the size of these openings beyond the usual periphery of the pipes, which is necessary in case the spouts project beyond the normal periphery of the pipes.

What I claim is—

The combination with vertical pipes C, E, of the pipes D arranged one above the other and entering said pipes C, E, said pipes D having at their delivery ends dams $c$ formed by inwardly-projecting integral portions of the pipe-walls, substantially as described.

In testimony whereof I have hereunto set my hand in the presence of two subscribing witnesses.

GEORGE P. ADAMSON.

Witnesses:
H. D. MAXWELL,
GEO. C. KRESSLER.